(12) United States Patent
Du

(10) Patent No.: US 11,601,508 B2
(45) Date of Patent: Mar. 7, 2023

(54) NETWORK ACCESS METHOD AND DEVICE FOR EDGE ROUTER

(71) Applicants: Beijing Jingdong Shangke Information Technology Co., Ltd., Beijing (CN); Beijing Jingdong Century Trading Co., Ltd., Beijing (CN)

(72) Inventor: Haifeng Du, Beijing (CN)

(73) Assignees: Beijing Jingdong Shangke Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 74 days.

(21) Appl. No.: 17/043,485

(22) PCT Filed: Apr. 26, 2019

(86) PCT No.: PCT/CN2019/084639
§ 371 (c)(1),
(2) Date: Sep. 29, 2020

(87) PCT Pub. No.: WO2019/206295
PCT Pub. Date: Oct. 31, 2019

(65) Prior Publication Data
US 2021/0021688 A1    Jan. 21, 2021

(30) Foreign Application Priority Data
Apr. 28, 2018  (CN) .......................... 201810401697.1

(51) Int. Cl.
*H04L 49/00*  (2022.01)
*H04L 67/2876*  (2022.01)
(Continued)

(52) U.S. Cl.
CPC .......... *H04L 67/2876* (2013.01); *H04L 12/66* (2013.01); *H04L 49/3009* (2013.01); *H04L 67/561* (2022.05); *H04L 67/563* (2022.05)

(58) Field of Classification Search
CPC . H04L 67/2876; H04L 12/66; H04L 49/3009; H04L 67/2804; H04L 67/2814;
(Continued)

(56) References Cited

U.S. PATENT DOCUMENTS 6,101,549 A * 8/2000 Baugher ............... H04L 47/826
709/239
8,655,990 B2   2/2014 Zhu et al.
(Continued)

FOREIGN PATENT DOCUMENTS

CN       1897589 A     1/2007
CN     101001264 A     7/2007
(Continued)

OTHER PUBLICATIONS

International Search Report for PCT/CN2019/084639, dated Jul. 30, 2019, 2 pages.
(Continued)

*Primary Examiner* — Aftab N. Khan
(74) *Attorney, Agent, or Firm* — Blank Rome LLP

(57) ABSTRACT

Disclosed by embodiments of the present application are a network access method used for an edge router and an edge router. One specific embodiment of the method comprises: receiving a first request message sent by a first tenant network edge device among at least one tenant network edge device; on the basis of port information of a port connected to the first tenant network edge device, obtaining a first request identification corresponding to the first tenant network edge device, wherein the first request identification is used to identify the first tenant network edge device; adding
(Continued)

the first request identification to the first request message so as to generate a processed first request message; and on the basis of a stored routing table, forwarding the processed first request message to a cloud gateway.

12 Claims, 10 Drawing Sheets

(51) Int. Cl.
  *H04L 12/66* (2006.01)
  *H04L 67/561* (2022.01)
  *H04L 67/563* (2022.01)
(58) Field of Classification Search
  CPC ............ H04L 12/4654; H04L 12/4666; H04L 45/745; H04L 67/10; H04L 67/141
  See application file for complete search history.

(56) References Cited

U.S. PATENT DOCUMENTS

| | | | | |
|---|---|---|---|---|
| 10,491,715 | B1* | 11/2019 | Wu | H04L 69/08 |
| 11,218,569 | B1* | 1/2022 | Wu | H04L 69/08 |
| 2003/0165121 | A1* | 9/2003 | Leung | H04W 4/18 |
| | | | | 370/313 |
| 2008/0240100 | A1* | 10/2008 | Smith | H04L 12/4641 |
| | | | | 370/392 |
| 2009/0201988 | A1 | 8/2009 | Gazier et al. | |
| 2011/0075674 | A1 | 3/2011 | Li et al. | |
| 2014/0112137 | A1 | 4/2014 | Schlansker et al. | |
| 2016/0142310 | A1 | 5/2016 | Means | |
| 2017/0063674 | A1* | 3/2017 | Maskalik | H04L 12/66 |
| 2019/0036876 | A1* | 1/2019 | Raza | H04L 61/2514 |
| 2020/0169609 | A1* | 5/2020 | Wang | H04W 4/60 |
| 2020/0169610 | A1* | 5/2020 | Wang | H04W 4/60 |
| 2021/0021688 | A1* | 1/2021 | Du | H04L 49/3009 |

FOREIGN PATENT DOCUMENTS

| | | |
|---|---|---|
| CN | 101009635 A | 8/2007 |
| CN | 101400098 A | 4/2009 |
| CN | 102577270 A | 7/2012 |
| CN | 103795630 A | 5/2014 |
| CN | 106101023 A | 11/2016 |
| EP | 2945322 A1 | 11/2015 |

OTHER PUBLICATIONS

European Search Report for EP 19792361, dated Dec. 14, 2021, 13 pgs.

* cited by examiner

NETWORK ACCESS METHOD AND DEVICE FOR EDGE ROUTER

CROSS-REFERENCE TO RELATED APPLICATIONS

The present application is a U.S. National Phase Application under 35 U.S.C. 371 of International Application No. PCT/CN2019/084639 filed Apr. 26, 2019, which claims priority to Chinese Patent Application No. 201810401697.1 filed on. Apr. 28, 2018 by the applicants BEIJING JINGDONG SHANGKE INFORMATION TECHNOLOGY CO., LTD., and BEIJING JINGDONG CENTURY TRADING CO., LTD., and titled "Network access method and device for edge router", the entire contents of which are herein incorporated by reference.

TECHNICAL FIELD

Embodiments of the present disclosure relate to the field of computer technology, and specifically to a network access method and apparatus for an edge router.

BACKGROUND

With the rise of cloud computing, many enterprise users choose to rent public cloud services for new demands. However, enterprises originally maintain a large amount of infrastructure. Therefore, it is necessary to realize the network connection between a cloud network rented by an enterprise user and its existing infrastructure.

SUMMARY

Embodiments of the present disclosure provide a network access method and apparatus for an edge router.

In a first aspect, an embodiment of the present disclosure provides a network access method for an edge router, the edge router being in communication connection with a cloud gateway and at least one tenant network edge device, the method including: receiving a first request message sent by a first tenant network edge device in the at least one tenant network edge device; acquiring a first request identifier corresponding to the first tenant network edge device based on port information of a port connected to the first tenant network edge device, the first request identifier being used to identify the first tenant network edge device; adding the first request identifier to the first request message to generate a processed first request message; and forwarding the processed first request message to the cloud gateway, based on a stored routing table.

In some embodiments, receiving a first response message sent by the cloud gateway in response to the first request message, where the first response message includes a first response identifier, and the first response identifier is used to identify the first tenant network edge device; removing the first response identifier for the first response message to generate a processed first response message; and forwarding the processed first response message to the first tenant network edge device, based on the port information.

In some embodiments, the edge router is in communication connection with an access switch, and the access switch is in communication connection with a second tenant network edge device of the at least one tenant network edge device, and the method further includes: receiving an intermediate message sent by the access switch, wherein the intermediate message comprises a second tenant identifier and a second request message received by the access switch from the second tenant network edge device, and the second tenant identifier is used to identify the second tenant network edge device; acquiring a second request identifier corresponding to the second tenant network edge device based on the second tenant identifier; adding the second request identifier to the intermediate message, and removing the second tenant identifier, to generate a processed intermediate message; and forwarding the processed intermediate message to the cloud gateway, based on the routing table.

In some embodiments, receiving a second response message sent by the cloud gateway in response to the second request message, where the second response message includes a second response identifier, and the second response identifier is used to identify the second tenant network edge device; acquiring the second tenant identifier corresponding to the second tenant network edge device based on the second response identifier; removing the second response identifier for the second response message, and adding the second tenant identifier, to generate a processed second response message; and forwarding the processed second response message to the access switch, based on the routing table.

In a second aspect, an embodiment of the present disclosure provides a network access apparatus for an edge router, the edge router being in communication connection with a cloud gateway and at least one tenant network edge device, the apparatus including: a first request message receiving unit, configured to receive a first request message sent by a first tenant network edge device in the at least one tenant network edge device; a first request identifier acquisition unit, configured to acquire a first request identifier corresponding to the first tenant network edge device based on port information of a port connected to the first tenant network edge device, the first request identifier being used to identify the first tenant network edge device; a first request message processing unit, configured to add the first request identifier to the first request message to generate a processed first request message; and a first request message forwarding unit, configured to forward the processed first request message to the cloud gateway, based on a stored routing table.

In some embodiments, the apparatus further includes: a first response message receiving unit, configured to receive a first response message sent by the cloud gateway in response to the first request message, wherein the first response message comprises a first response identifier, and the first response identifier is used to identify the first tenant network edge device; a first response message processing unit, configured to remove the first response identifier for the first response message to generate a processed first response message; and a first response message forwarding unit, configured to forward the processed first response message to the first tenant network edge device, based on the port information.

In some embodiments, the edge router is in communication connection with an access switch, and the access switch is in communication connection with a second tenant network edge device of the at least one tenant network edge device, and the apparatus further includes: an intermediate message receiving unit, configured to receive an intermediate message sent by the access switch, where the intermediate message comprises a second tenant identifier and a second request message received by the access switch from the second tenant network edge device, and the second tenant identifier is used to identify the second tenant network edge device; a second request identifier acquisition unit, configured to acquire a second request identifier corresponding to the second tenant network edge device based on the second tenant identifier; an intermediate message processing unit, configured to add the second request identifier to the intermediate message, and remove the second tenant identifier, to generate a processed intermediate message; and an intermediate message forwarding unit, configured to forward the processed intermediate message to the cloud gateway, based on the routing table.

In some embodiments, the apparatus further includes: a second response message receiving unit, configured to receive a second response message sent by the cloud gateway in response to the second request message, wherein the second response message comprises a second response identifier, and the second response identifier is used to identify the second tenant network edge device; a second tenant identifier acquisition unit, configured to acquire the second tenant identifier corresponding to the second tenant network edge device based on the second response identifier; a second response message processing unit, configured to remove the second response identifier for the second response message, add the second tenant identifier, to generate a processed second response message; and a second response message forwarding unit, configured to forward the processed second response message to the access switch, based on the routing table.

In a third aspect, an embodiment of the present disclosure provides a electronic device, including: one or more processors; and a storage apparatus, storing one or more programs thereon; and where the one or more programs, when executed by the one or more processors, cause the one or more processors to implement the method according to any implementation in the first aspect.

In a fourth aspect, an embodiment of the present disclosure provides a computer readable medium, storing a computer program thereon, where the program, when executed by a processor, implements the method according to any implementation in the first aspect.

The network access method and apparatus for an edge router provided by embodiments of the present disclosure, by identifying a connection port with the first tenant network edge device, acquiring the first request identifier corresponding to the first tenant network edge device and adding a first identifier to the first request message sent by the first tenant network edge device, and then forwarding the processed first request message to the cloud gateway, thus network connection between the first tenant network edge device and the cloud gateway is realized, and the port information of the port connected to the edge router is used in the data transmission process. The first request identifier enables the edge router to identify the first tenant network edge device, thereby helping to realize isolation and safety of the data transmission process of the first tenant network edge device.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and embodiments. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that embodiments in the present disclosure and the features in the embodiments may be combined with each other on a non-conflict basis. The present disclosure will be described below in detail with reference to the accompanying drawings and in combination with the embodiments.

Figure 1:
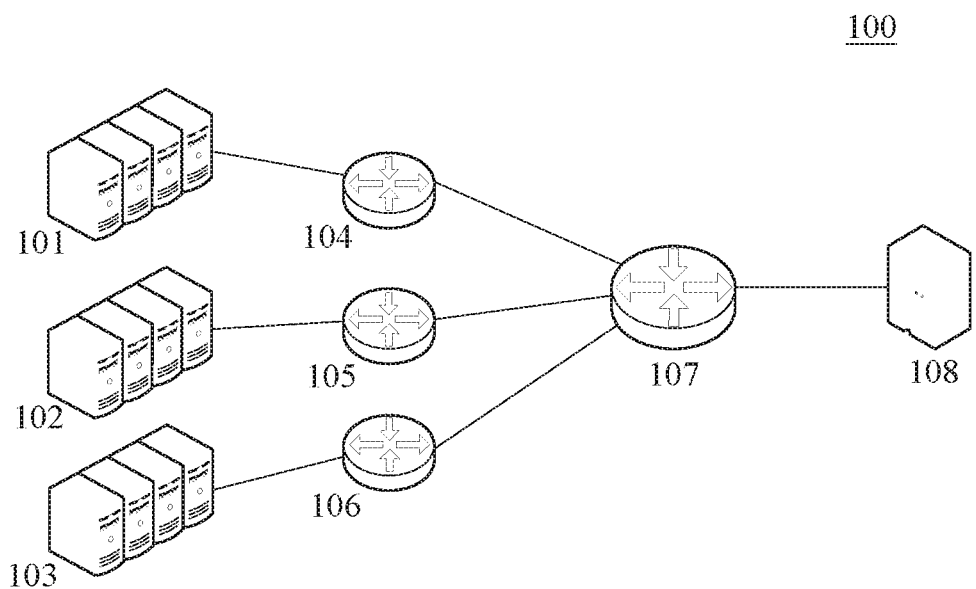
FIG. 1 is a diagram of an example system architecture in which embodiments of the present disclosure may be implemented.

FIG. 1 illustrates an example system architecture 100 of a network access method for an edge router in which embodiments of the present disclosure may be implemented.

As shown in FIG. 1, the system architecture 100 may include: Tenant A private infrastructure 101, Tenant B private infrastructure 102, Tenant C private infrastructure 103; Tenant A private tenant network edge device 104, Tenant B private tenant network edge device 105, Tenant C private tenant network edge device 106; cloud service provider D private edge router 107; cloud service provider D private cloud gateway 108. The infrastructure 101 is in communication connection with the tenant network edge device 104. The infrastructure 102 is in communication connection with the tenant network edge device 105. The infrastructure 103 is in communication connection with the tenant network edge device 106. The tenant network edge devices 104, 105, and 106 are in communication connection with the edge router 107, respectively. The edge router 107 is in communication connection with the cloud gateway 108. The above communication connection may include various types of connections, such as wired, wireless communication links, or optic fibers implemented through various network mediums (such as twisted pair, coaxial cable, and optical fibers) and the like.

Tenant A, tenant B, and tenant C may rent cloud resources provided by cloud service provider D. Tenant A, tenant B, and tenant C may be individuals, enterprises, colleges, government departments, hotels, or other telecommunications operators. Cloud service provider D may provide tenant A, tenant B, and tenant C with various hardware, software and other system resources.

The infrastructures 101, 102, and 103 may be some existing hardware or software devices of tenant A, tenant B, and tenant C, such as servers, routers, switches, hubs, desktop computers, notebooks, printers, handheld devices, system software or software modules. The tenant network edge devices 104, 105, and 106 and the edge router 107 may refer to switches, routers, routing switches, integrated access devices, etc. installed on an edge network. Generally, the edge network includes the last segment of network connected to tenant A, tenant B, and tenant C. The cloud gateway 108 may be a mainframe computer, a server, etc., and may realize the network interconnection between the infrastructure 101, 102, and 103 of tenant A, tenant B, and tenant C and the cloud resources provided by cloud service provider D.

It should be noted that the network access method for an edge router provided by embodiments of the present disclosure may be performed by the edge router 107. Accordingly, a network access apparatus for an edge router may also be provided in the edge router 107. The network access method for an edge router provided by the embodiments of the present disclosure may also be performed by a plurality pieces of software or a plurality of software modules, which is not limited herein.

It should be understood that the number of tenants, infrastructures, tenant network edge devices, edge routers, cloud gateways, and cloud service providers in FIG. 1 is merely illustrative. Depending on the implementation needs, there may be any number of tenants, infrastructures, tenant network edge devices, edge routers, cloud gateways, and cloud service providers.

Figure 2:
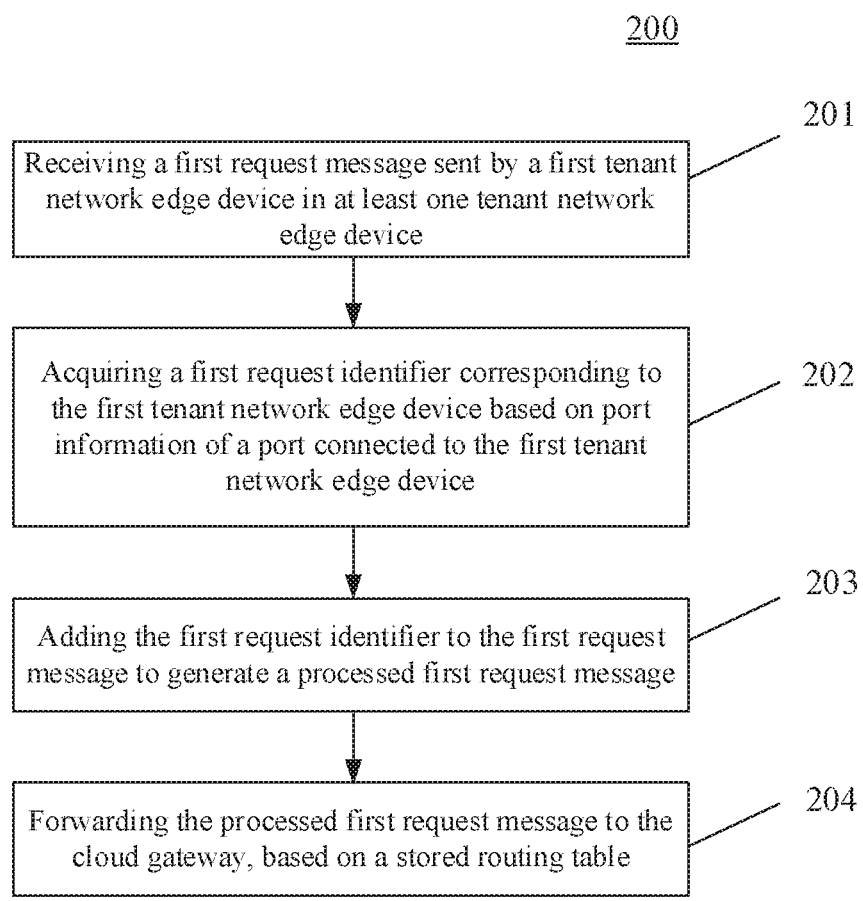
FIG. 2 is a flowchart of a network access method for an edge router according to an embodiment of the present disclosure.

With further reference to FIG. 2, a flow 200 of a network access method for an edge router according to an embodiment of the present disclosure is illustrated. An edge router (the edge router 107 as shown in FIG. 1), a cloud gateway (the cloud gateway 108 as shown in FIG. 1) and at least one tenant network edge device (the tenant network edge devices 104, 105, and 106 as shown in FIG. 1) are in communication connection. The network access method for an edge router includes the following steps.

Step 201, receiving a first request message sent by a first tenant network edge device in the at least one tenant network edge device.

In the present embodiment, an executing body of the network access method for an edge router (for example, the edge router 107 as shown in FIG. 1) may receive the first request message sent by the first tenant network edge device (for example, the tenant network edge device 101, 102 or 103 as shown in FIG. 1). The first tenant network edge device may be any tenant network edge device that sends the first request message to the executing body and is in communication connection with the executing body. The first request message may be data organized in a certain format sent by the first tenant network edge device.

Step 202, acquiring a first request identifier corresponding to the first tenant network edge device based on port information of a port connected to the first tenant network edge device.

In the present embodiment, the executing body usually has a certain number of physical ports for communication connection with other devices. The executing body may acquire the first request identifier corresponding to the first tenant network edge device based on the port information of the port connected to the first tenant network edge device. The port information may be a port number, or a port identifier pre-designated by a cloud service provider or those skilled in the art. Each port generally has different port information. The first request identifier is used to identify the first tenant network edge device. The first request identifier may be an identifier preset by the cloud service provider or those skilled in the art that may identify the first tenant network edge device. The first request identifier may alternatively be an identifier generated by using a predetermined rule that may identify the first tenant network edge device. Alternatively, the executing body may store a corresponding relationship table between the first tenant network edge device and the first request identifier, so as to identify the first network edge device based on the port information of the port connected to the first tenant network edge device, then, the first request identifier corresponding to the first tenant network edge device may be found according to the corresponding relationship table. Alternatively, after identifying the first network edge device based on the port information of the port connected to the first tenant network edge device, the executing body may also send a request to its cloud service provider or other devices (such as the cloud gateway 108 as shown in FIG. 1) to acquire the first request identifier corresponding to the first tenant network edge device.

Step 203, adding the first request identifier to the first request message to generate a processed first request message.

In the present embodiment, the executing body may add the first request identifier to the received first request message to generate the processed first request message. Generally, the first request identifier may be added to the beginning part of the first request message. For example, for the first request message containing two parts: request header and request body, the first request identifier may be added to the request header part, or the first request identifier may be added before the request header.

Step 204, forwarding the processed first request message to the cloud gateway, based on a stored routing table.

In the present embodiment, the executing body may forward the processed first request message generated in step 203 based on the stored routing table. The routing table usually refers to a stored routing information table, storing a path to a predetermined network terminal. The routing table may be a fixed routing manually configured in the router by those skilled in the art or a manager, that is, a static routing table. The routing table may alternatively be a routing table automatically established by a dynamic routing protocol using such as a link state algorithm, a distance vector algorithm, or a Dijkstra algorithm, that is, a dynamic routing table. The executing body may also create a corresponding VRF (virtual routing forwarding) for the first tenant network edge device, and store the corresponding relationship between the first tenant network edge device and its corresponding VRF. The routing table corresponding to the first tenant network edge device is stored in the VRF corresponding to the first tenant network edge device. The executing body may search for the VRF corresponding to the first tenant network edge device, then search for the routing table from the VRF, and forward the processed first request message to the cloud gateway.

Figure 3:
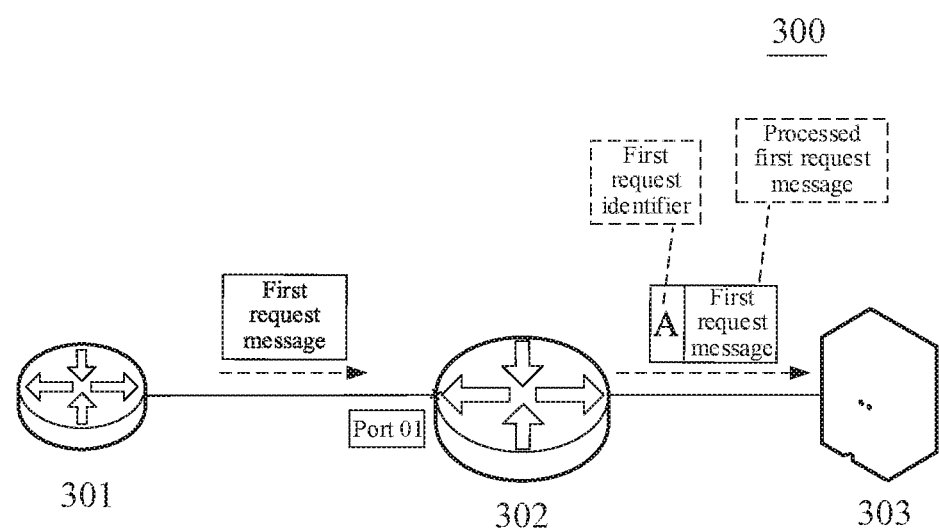
FIG. 3 is a schematic diagram of an application scenario of the network access method for an edge router according to an embodiment of the present disclosure.

With further reference to FIG. 3, FIG. 3 is a schematic diagram of an application scenario of the network access method for an edge router according to the present embodiment. In the application scenario of FIG. 3, an edge router 302 is in communication connection with a first tenant network edge device 30 and a cloud gateway 303. The edge router 302 may receive a first request message sent by the first tenant network edge device 301. Then, the edge router 302 acquires the first request identifier "A" corresponding to the first tenant network edge device 301 based on the port number "01" of a port connected to the first tenant network edge device 301. Then, the first request identifier "A" is added to the front of the first request message to generate a processed first request message. Then, based on a routing table stored in the edge router, the first request message is forwarded to the cloud gateway 303.

The network access method for an edge router provided by the above embodiment of the present disclosure, by identifying a connection port with the first tenant network edge device, acquiring the first request identifier corresponding to the first tenant network edge device and adding a first identifier to the first request message sent by the first tenant network edge device, and then forwarding the processed first request message to the cloud gateway, thus network connection between the first tenant network edge device and the cloud gateway is realized, and the port information of the port connected to the edge router is used in the data transmission process. The first request identifier enables the edge router to identify the first tenant network edge device, thereby helping to realize isolation and safety of the data transmission process of the first tenant network edge device.

Figure 4:
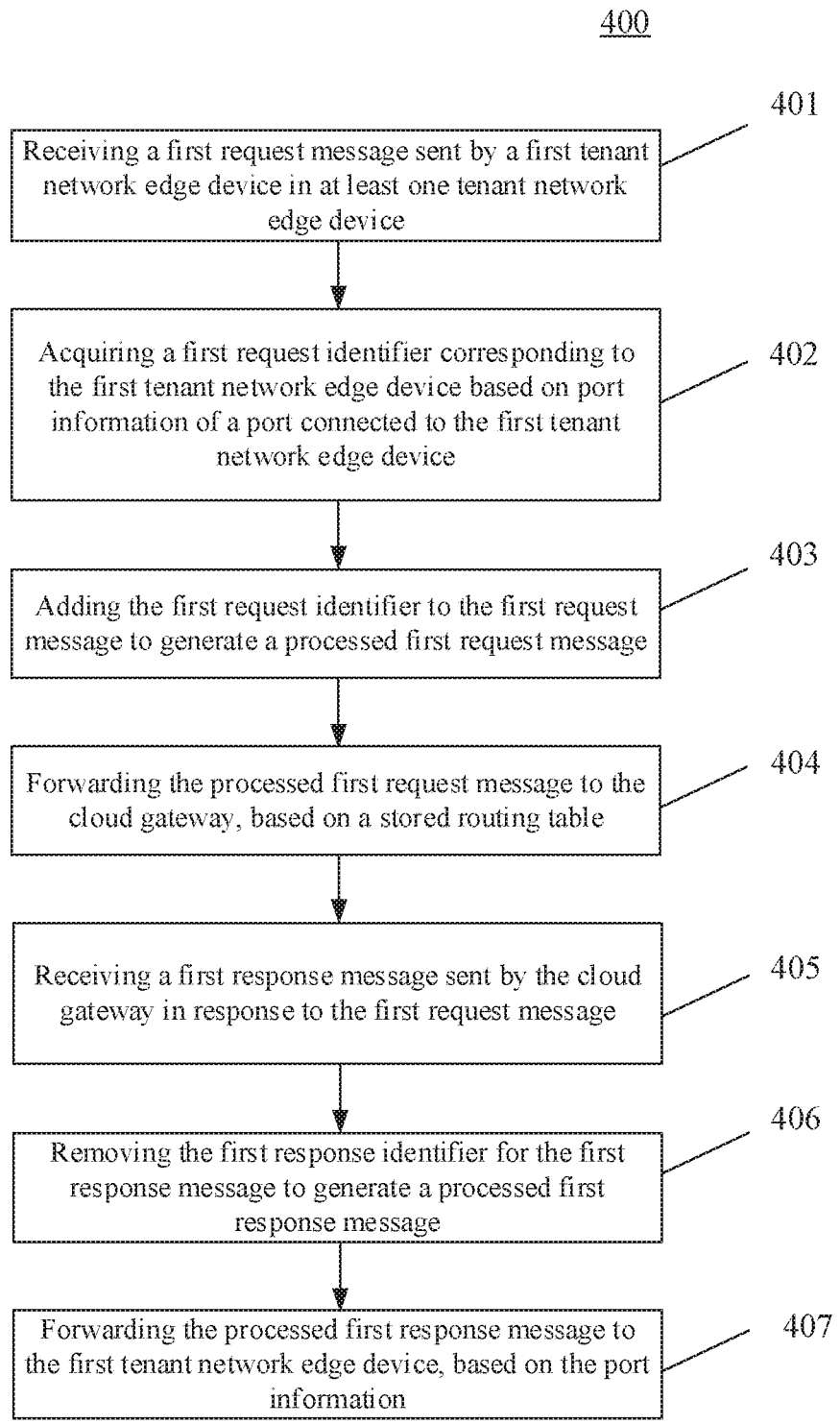
FIG. 4 is a flowchart of the network access method for an edge router according to another embodiment of the present disclosure.

With further reference to FIG. 4, a flow 400 of another embodiment of the network access method for an edge router according to the present disclosure is illustrated. The flow 400 of the network access method for an edge router includes the following steps.

Step 401, receiving a first request message sent by a first tenant network edge device in the at least one tenant network edge device.

Step 402, acquiring a first request identifier corresponding to the first tenant network edge device based on port information of a port connected to the first tenant network edge device.

Step 403, adding the first request identifier to the first request message to generate a processed first request message.

Step 404, forwarding the processed first request message to the cloud gateway, based on a stored routing table.

For the specific processing and the technical effects thereof of the above steps 401, 402, 403 and 404, reference may be made to the relevant descriptions of the steps 201, 202, 203 and 204 in the corresponding embodiment of FIG. 2 respectively, and detailed description thereof will be omitted.

Step 405, receiving a first response message sent by the cloud gateway in response to the first request message.

In the present embodiment, the executing body may receive the first response message sent by the cloud gateway (such as the cloud gateway 108 as shown in FIG. 1) in response to the first request message. The first response message includes a first response identifier, and the first response identifier is used to identify the first tenant network edge device. The first response message may be data organized in a certain format and the data is returned for the content of the first request message by the cloud gateway. The first response identifier may be an identifier preset by the cloud service provider or those skilled in the art that may identify the first tenant network edge device. The first response identifier may alternatively be an identifier generated by using a predetermined rule that may identify the first tenant network edge device. Alternatively, the cloud gateway may store a corresponding relationship table between the first tenant network edge device and the first response identifier, so that the cloud gateway can generate the first response message including the first response identifier, in response to the first request message sent by the first tenant network edge device. Alternatively, the cloud gateway may alternatively send a request to its cloud service provider or other devices to acquire the first response identifier corresponding to the first tenant network edge device. It should be noted that the first response identifier and the first request identifier may be the same or different.

Step 406, removing the first response identifier for the first response message to generate a processed first response message.

In the present embodiment, the executing body may remove the first response identifier for the received first response message, to generate the processed first message. Generally, the first response identifier may occupy several data bits in the first response message, then these data bits may be deleted or the data values on these data bits may be replaced with other preset default data values, so that there is no longer the first response identifier in the first response message.

Step 407, forwarding the processed first response message to the first tenant network edge device, based on the port information.

In the present embodiment, the executing body may acquire the port information of the port corresponding to the first tenant network edge device, and then forward the processed first response message generated in the step 406 to the first tenant network edge device through the port corresponding to the first tenant network edge device.

Figure 5:
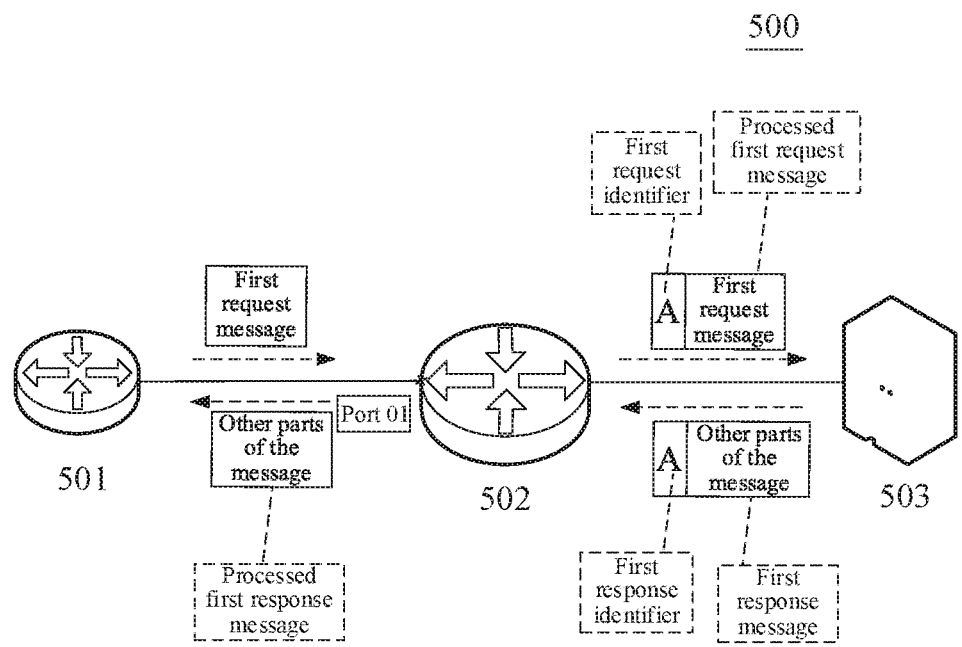
FIG. 5 is a schematic diagram of another application scenario of the network access method for an edge router according to an embodiment of the present disclosure.

With further reference to FIG. 5, FIG. 5 is a schematic diagram of another application scenario of the network access method for an edge router according to the present embodiment. In the application scenario of FIG. 5, an edge router 502 is in communication connection with a first tenant network edge device 501 and a cloud gateway 503. The edge router 502 may receive a first request message sent by the first tenant network edge device 501. Then, the edge router acquires the first request identifier "A" corresponding to the first tenant network edge device 501 based on the port number "01" of a port connected to the first tenant network edge device 501. Then, the first request identifier "A" is added to the front of the first request message to generate a processed first request message. Then, based on a routing table stored in the edge router, the processed first request message is forwarded to the cloud gateway 503. The edge router 502 may also receive a first response message sent by the cloud gateway 503 in response to the first request message. The first response message includes other parts of the message and the first response identifier "A" (here, it is assumed that the first request identifier and the first response identifier are the same). Then, the edge router 502 may remove the first response identifier "A" in the first response message to generate a processed first response message. Then, based on the port with the port number "01" corresponding to the first tenant network edge device 501, the processed first response message is sent from the port with the port number "01" to the first tenant network edge device 501.

It can be seen from FIG. 4 that, compared with the embodiment corresponding to FIG. 2, the solution described in the present embodiment may realize the network connection between the first tenant network edge device and the cloud gateway. At the same time, during the data transmission between both parties, the port information of the port of the edge router, the first request identifier and the first response identifier are used to enable the cloud gateway and the edge router to identify the first tenant network edge device, thereby helping to realize isolation and safety of the data transmission process between the both parties.

Figure 6:
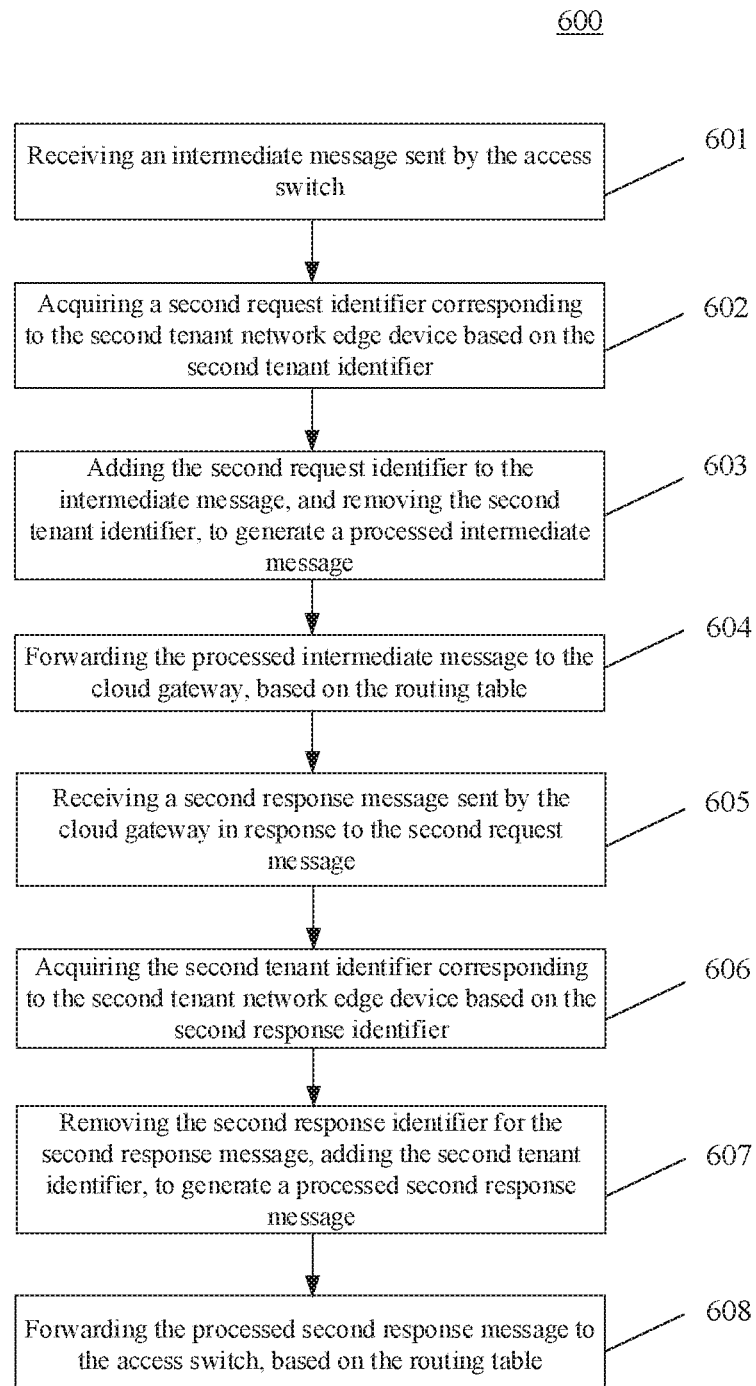
FIG. 6 is a flowchart of the network access method for an edge router according to another embodiment of the present disclosure.
Figure 7:
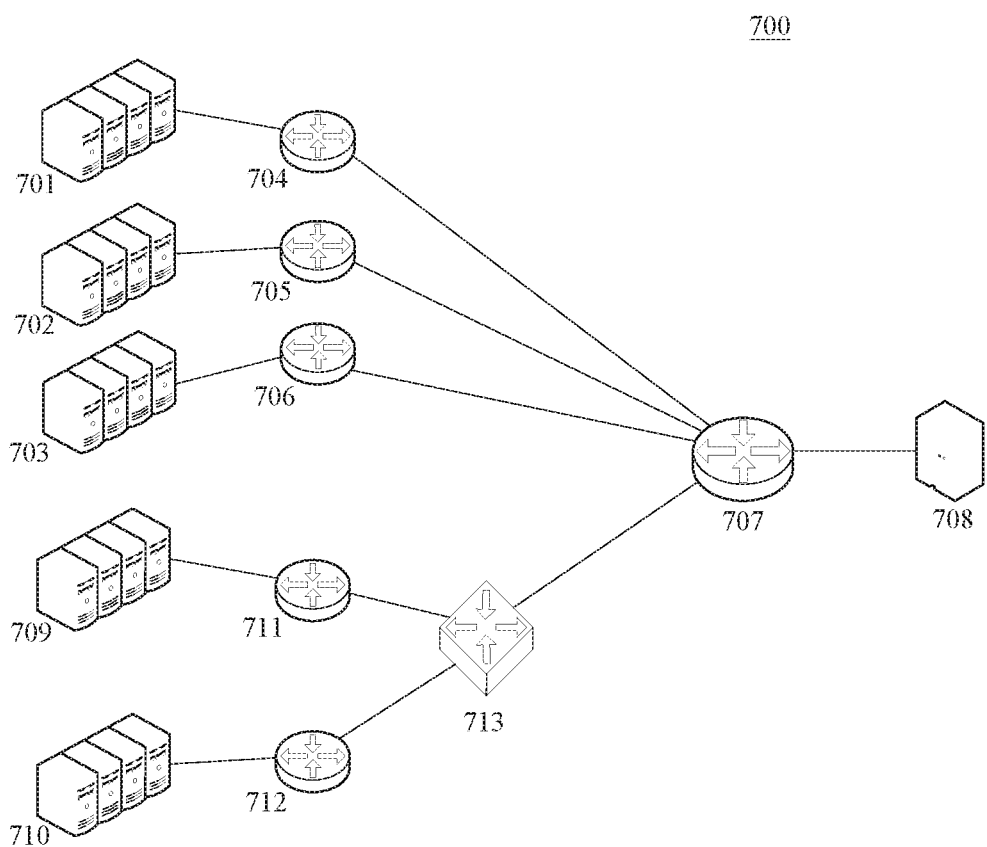
FIG. 7 is a diagram of another example system architecture in which embodiments of the present disclosure may be implemented.

With further reference to FIG. 6 and FIG. 7, FIG. 6 illustrates a flow 600 of the network access method for an edge router according to another embodiment of the present disclosure. FIG. 7 illustrates another example architecture 700 of the network access method for an edge router in which an embodiment of the present disclosure may be implemented. As shown in FIG. 7, the system architecture 700 may include: Tenant E private infrastructure 701, Tenant F private infrastructure 702, Tenant G private infrastructure 703, Tenant H private infrastructure 709, Tenant I private infrastructure 710; Tenant E private tenant network edge device 704, Tenant F private tenant network edge device 705, Tenant G private tenant network edge device 706, Tenant H private tenant network edge device 711, Tenant I private tenant network edge device 712; cloud service provider J private edge router 707, cloud service provider J private access switch 713, cloud service provider J private cloud gateway 708. The infrastructure 701 is in communication connection with the tenant network edge device 704. The infrastructure 702 is in communication connection with the tenant network edge device 705. The infrastructure 703 is in communication connection with the tenant network edge device 706. The infrastructure 709 is in communication connection with the tenant network edge device 711. The infrastructure 710 is in communication connection with the tenant network edge device 712. The tenant network edge devices 704, 705, and 706 are in communication connection with the edge router 707, respectively. The tenant network edge devices 711 and 712 are in communication connection with the access switch 713, respectively. The access switch 713 is in communication connection with the edge router 707. The edge router 707 is in communication connection with the cloud gateway 708. The above communication connection may include various types of connections, such as wired, wireless communication links, or optic fibers implemented through various network mediums (such as twisted pair, coaxial cable, and optical fibers) and the like.

Tenants E, F, G, H and I may rent cloud resources provided by cloud service provider J. Tenants E, F, G, H and I may be individuals, enterprises, colleges, government departments, hotels, or other telecommunications operators. Cloud service provider J may provide tenants E, F, G, H and I with various hardware, software and other system resources.

The infrastructure 701, 702, 703, 709, 710 may be some existing hardware or software devices of tenants E, F, G, H and I, such as servers, routers, switches, hubs, desktop computers, notebooks, printers, handheld devices, system software or software modules. The tenant network edge devices 704, 705, 706, 711, and 712, the access switch 713 and the edge router 707 may refer to switches, routers, routing switches, integrated access devices, etc. installed on an edge network. Generally, the edge network includes the last segment of network connected to tenants E, F, G, H and I. The cloud gateway 708 may be a mainframe computer, a server, etc., and may realize the network interconnection between the infrastructures 701, 702, 703, 709, and 710 of tenants E, F, G, H and I and the cloud resources provided by cloud service provider D.

It should be understood that the number of tenants, infrastructures, tenant network edge devices, access switches, edge routers, cloud gateways, and cloud service providers in FIG. 7 is merely illustrative. Depending on the implementation needs, there may be any number of tenants, infrastructures, tenant network edge devices, edge routers, cloud gateways, and cloud service providers.

In the flow 600 of the network access method for an edge router, the edge router is in communication connection with an access switch, and the access switch is in communication connection with a second tenant network edge device of the at least one tenant network edge device. The method includes the following steps.

Step 601, receiving an intermediate a message sent by the access switch.

In the present embodiment, an executing body (for example, the edge router 707 as shown in FIG. 7) of the network access method for an edge router may receive the intermediate message sent by the access switch (for example, the access switch 713 as shown in FIG. 7). The intermediate message includes a second tenant identifier and a second request message received by the access switch from the second tenant network edge device, and the second tenant identifier is used to identify the second tenant network edge device. The intermediate message may be generated after processing the second request message sent by the second tenant network edge device (for example, the tenant network edge devices 711 and 712 as shown in FIG. 7). The second tenant network edge device may be any tenant network edge device that sends the second request message to the access switch and is in communication connection with the access switch. The second request message may be data organized in a certain format sent by the second tenant network edge device.

In practice, the access switch has a certain number of physical ports for communication connection with other devices. The access switch may acquire the second tenant identifier corresponding to the second tenant network edge device based on the port information of the port connected to the second tenant network edge device. The port information may be a port number, or a port identifier pre-designated by a cloud service provider or those skilled in the art. Each port generally has different port information. The second tenant identifier may be an identifier preset by the cloud service provider or those skilled in the art that may identify the second tenant network edge device. The second tenant identifier may alternatively be an identifier generated by using a predetermined rule that may identify the second tenant network edge device. Alternatively, the access switch may store a corresponding relationship table between the second tenant network edge device and the second request identifier, so as to identify the second network edge device based on the port information of the port connected to the second tenant network edge device, then, the second request identifier corresponding to the second tenant network edge device may be found according to the corresponding relationship table. Alternatively, after identifying the second network edge device based on the port information of the port connected to the second tenant network edge device, the access switch may also send a request to its cloud service provider or other devices (such as the edge router 707, the cloud gateway 708 as shown in FIG. 7) to acquire the second request identifier corresponding to the second tenant network edge device.

Step 602, acquiring a second request identifier corresponding to the second tenant network edge device based on the second tenant identifier.

In the present embodiment, the executing body may acquire the second request identifier corresponding to the second tenant network edge device based on the second tenant identifier in the intermediate message. The second request identifier may be an identifier preset by the cloud service provider or those skilled in the art that may identify the second tenant network edge device. The second request identifier may alternatively be an identifier generated by using a predetermined rule that may identify the second tenant network edge device. Alternatively, the edge router may store a corresponding relationship table of the second tenant network edge device, the second tenant identifier and the second request identifier, so as to find the second request identifier corresponding to the second tenant network edge device, based on the second tenant identifier in the received intermediate message, according to the foregoing corresponding relationship table. Alternatively, the access switch may also send a request to its cloud service provider or other devices (for example, the cloud gateway 708 and the like as shown in FIG. 7) to acquire the second request identifier corresponding to the second tenant identifier based on the second tenant identifier. It should be noted that the second request identifier and the second tenant identifier may be the same or different.

Step 603, adding the second request identifier to the intermediate message, and removing the second tenant identifier, to generate a processed intermediate message.

In the present embodiment, the executing body may add the second request identifier to the received intermediate message, and remove the second tenant identifier, to generate the processed intermediate message. Generally, the second request identifier may be added to the beginning part of the intermediate message. For example, for the second request message containing two parts: request header and request body, the second request identifier may be added to the request header part, or the second request identifier may be added before the request header. The second tenant identifier may occupy several data bits in the intermediate message, then these data bits may be deleted or the data values on these data bits may be replaced with other preset default data values, so that there is no longer the second tenant identifier in the intermediate message.

Step 604, forwarding the processed intermediate message to the cloud gateway, based on the routing table.

In the present embodiment, the executing body may forward the processed intermediate message generated in the step 603 to the cloud gateway, based on the routing table. The routing table usually refers to a stored routing information table, storing a path to a predetermined network terminal. The routing table may be a fixed routing manually configured in the router by those skilled in the art or a manager, that is, a static routing table. The routing table may alternatively be a routing table automatically established by a dynamic routing protocol using such as a link state algorithm, a distance vector algorithm, or a Dijkstra algorithm, that is, a dynamic routing table. The executing body may also create a corresponding VRF (virtual routing forwarding) for the second tenant network edge device, and store the corresponding relationship between the second tenant network edge device and its corresponding VRF. The routing table corresponding to the second tenant network edge device is stored in the VRF corresponding to the second tenant network edge device. The executing body may search for the VRF corresponding to the second tenant network edge device, then search for the routing table from the VRF, and forward the processed second request message.

Step 605, receiving a second response message sent by the cloud gateway in response to the second request message.

In the present embodiment, the executing body may receive the second response message sent by the cloud gateway (such as the cloud gateway 708 as shown in FIG. 7) in response to the second request message. The second response message includes a second response identifier. The second response identifier is used to identify the second tenant network edge device. The second response message may be data organized in a certain format and the data is returned for the content of the second request message by the cloud gateway. The second response identifier may be an identifier preset by the cloud service provider or those skilled in the art that may identify the second tenant network edge device. The second response identifier may alternatively be an identifier generated by using a predetermined rule that may identify the second tenant network edge device. Alternatively, the cloud gateway may store a corresponding relationship table between the second tenant network edge device and the second response identifier, so that the cloud gateway can generate the second response message including the second response identifier, in response to the second request message sent by the second tenant network edge device. Alternatively, the cloud gateway may also send a request to its cloud service provider or other devices to acquire the second response identifier corresponding to the second tenant network edge device. It should be noted that the second response identifier and the second request identifier may be the same or different.

Step 606, acquiring the second tenant identifier corresponding to the second tenant network edge device based on the second response identifier.

In the present embodiment, the executing body may acquire the second tenant identifier corresponding to the second tenant network edge device based on the second response identifier in the received second response message. Alternatively, the executing body may store a corresponding relationship table between the second response identifier and the second tenant identifier, so that, based on the second response identifier, the second tenant identifier corresponding to the second response identifier may be found according to the above corresponding relationship table. Alternatively, the executing body may also send a request to its cloud service provider or other devices (such as the access switch 713, the cloud gateway 708 as shown in FIG. 7) to acquire the second tenant identifier corresponding to the second response identifier based on the second response identifier.

Step 607, removing the second response identifier for the second response message, adding the second tenant identifier, to generate a processed second response message.

In the present embodiment, the executing body may remove the second response identifier for the received second response message, add the second tenant identifier, to generate the processed second response message. Generally, the second response identifier may occupy several data bits in the second response message, then these data bits may be deleted or the data values on these data bits may be replaced with other preset default data values, so that there is no longer the second response identifier in the second response message. The executing body may also add the second tenant identifier to the beginning part of the second response message. For example, for the second response message containing two parts: request header and request body, the second tenant identifier may be added to the request header part, or the second tenant identifier may be added before the request header.

Step 608, forwarding the processed second response message to the access switch, based on the routing table.

In the present embodiment, the executing body may forward the processed second response message generated in the step 607 to the access switch, based on the stored routing table.

In practice, the access switch may acquire port information of a port corresponding to the second tenant network edge device, then remove the second tenant identifier in the processed second response message, and forward the processed second response message through the port corresponding to the second tenant network edge device to the second tenant network edge device.

Figure 8:
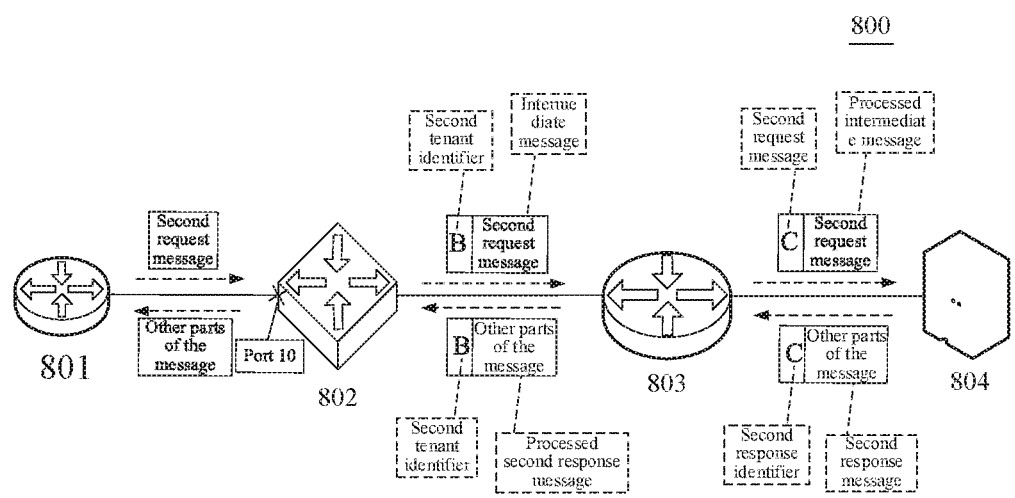
FIG. 8 is a schematic diagram of an application scenario of the network access method for an edge router according to an embodiment of the present disclosure.

With further reference to FIG. 8, FIG. 8 is a schematic diagram of another application scenario of the network access method for an edge router according to the present embodiment. In the application scenario of FIG. 8, an edge router 803 is in communication connection with an access switch 802 and a cloud gateway 804. A second tenant network edge device 801 is in communication connection with the access switch 802. The edge router 803 may receive an intermediate message sent by the access switch 802. The intermediate message includes a second tenant identifier "B" and a second request message. The second tenant identifier "B" is used to identify the second tenant network edge device 801, and the second request message is sent by the second tenant network edge device 801 first. Then, based on the second tenant identifier "B", a second request identifier "C" corresponding to the second tenant network edge device 801 is acquired. Then, the second request identifier "C" may be added to the intermediate message, and the second tenant identifier "B" may be removed, to generate a processed intermediate message. Then, the processed intermediate message is forwarded to the cloud gateway 804. The edge router 803 may also receive a second response message sent by the cloud gateway 804 in response to the second request message. The second response message contains the second response identifier "C" (here, it is assumed that the second response identifier and the second request identifier are the same). Then, based on the second response identifier, the second tenant identifier "B" corresponding to the second tenant network edge device 801 is acquired. Then, the second response identifier in the second response message may be removed, and the second tenant identifier may be added to generate a processed second response message. Then, the processed second response message is forwarded to the access switch 802. The access switch 802 may remove the second tenant identifier in the processed second response message, and forward the processed second response message after removing the second tenant identifier through the port "10" corresponding to the second tenant network edge device 801 to the second tenant network edge device 801.

It can be seen from FIG. 8 that, the solution described in the present embodiment may realize the network connection between the second tenant network edge device and the cloud gateway. At the same time, during the data transmission between both parties, the second tenant identifier, the second request identifier and the second response identifier are used to enable the cloud gateway and the edge router to identify the second tenant network edge device, thereby helping to realize isolation and safety of the data transmission process between the both parties.

Figure 9:
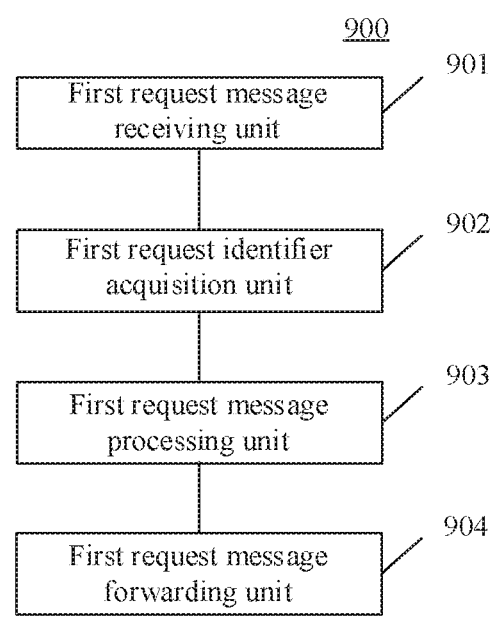
FIG. 9 is a schematic structural diagram of an network access apparatus for an edge router applied to an embodiment of the present disclosure.

With further reference to FIG. 9, as an implementation of the method shown in the above figures, an embodiment of the present disclosure provides a network access apparatus for an edge router, and the apparatus embodiment corresponds to the method embodiment as shown in FIG. 2, and the apparatus may be specifically applied to various electronic devices.

As shown in FIG. 9, the network access apparatus 900 for an edge router of the present embodiment includes: a first request message receiving unit 901, a first request identifier acquisition unit 902, a first request message processing unit 903 and a first request message forwarding unit 904. The first request message receiving unit 901 is configured to receive a first request message sent by a first tenant network edge device in the at least one tenant network edge device. The first request identifier acquisition unit 902 is configured to acquire a first request identifier corresponding to the first tenant network edge device based on port information of a port connected to the first tenant network edge device, the first request identifier being used to identify the first tenant network edge device. The first request message processing unit 903 is configured to add the first request identifier to the first request message to generate a processed first request message. The first request message forwarding unit 904 is configured to forward the processed first request message to the cloud gateway, based on a stored routing table.

In the present embodiment, in the network access apparatus 900 for an edge router: the specific processing and the technical effects thereof of the first request message receiving unit 901, the first request identifier acquisition unit 902, the first request message processing unit 903 and the first request message forwarding unit 904 may refer to the related descriptions of step 201, step 202, step 203 and step 204 in the corresponding embodiment of FIG. 2 respectively, and detailed description thereof will be omitted.

In some alternative implementations of the present embodiment, the network access apparatus 900 for an edge router further includes: a first response message receiving unit (not shown in the figure), configured to receive a first response message sent by the cloud gateway in response to the first request message, where the first response message includes a first response identifier, and the first response identifier is used to identify the first tenant network edge device; a first response message processing unit (not shown in the figure), configured to remove the first response identifier for the first response message to generate a processed first response message; and a first response message forwarding unit (not shown in the figure), configured to forward the processed first response message to the first tenant network edge device, based on the port information.

In some alternative implementations of the present embodiment, the edge router is in communication connection with an access switch, and the access switch is in communication connection with a second tenant network edge device of the at least one tenant network edge device. The network access apparatus 900 for an edge router further includes: an intermediate message receiving unit (not shown in the figure), configured to receive an intermediate message sent by the access switch, where the intermediate message includes a second tenant identifier and a second request message received by the access switch from the second tenant network edge device, and the second tenant identifier is used to identify the second tenant network edge device; a second request identifier acquisition unit (not shown in the figure), configured to acquire a second request identifier corresponding to the second tenant network edge device based on the second tenant identifier; an intermediate message processing unit (not shown in the figure), configured to add the second request identifier to the intermediate message, and remove the second tenant identifier, to generate a processed intermediate message; and an intermediate message forwarding unit (not shown in the figure), configured to forward the processed intermediate message to the cloud gateway, based on the routing table.

In some alternative implementations of the present embodiment, the network access apparatus 900 for an edge router further includes: a second response message receiving unit (not shown in the figure), configured to receive a second response message sent by the cloud gateway in response to the second request message, where the second response message includes a second response identifier, and the second response identifier is used to identify the second tenant network edge device; a second tenant identifier acquisition unit (not shown in the figure), configured to acquire the second tenant identifier corresponding to the second tenant network edge device based on the second response identifier; a second response message processing unit (not shown in the figure), configured to remove the second response identifier for the second response message, and add the second tenant identifier, to generate a processed second response message; and a second response message forwarding unit (not shown in the figure), configured to forward the processed second response message to the access switch, based on the routing table.

In the edge router provided in the above embodiment of the present disclosure, the first request message receiving unit 901 receives the first request message sent by the first tenant network edge device, the first request identifier acquisition unit 902 acquires the first request identifier corresponding to the first tenant network edge device based on the port information of the port connected to the first tenant network edge device, the first request identifier being used to identify the first tenant network edge device. Then, the first request message processing unit 903 adds the first request identifier to the first request message to generate the processed first request message, then the first request message forwarding unit 904 forwards the processed first request message to the cloud gateway, based on the stored routing table, thus network connection between the first tenant network edge device and the cloud gateway is realized, and the port information of the port connected to the edge router and the first request identifier are used to enable the edge router to identify the first tenant network edge device, thereby helping to realize isolation and safety of the data transmission process of the first tenant network edge device.

Figure 10:
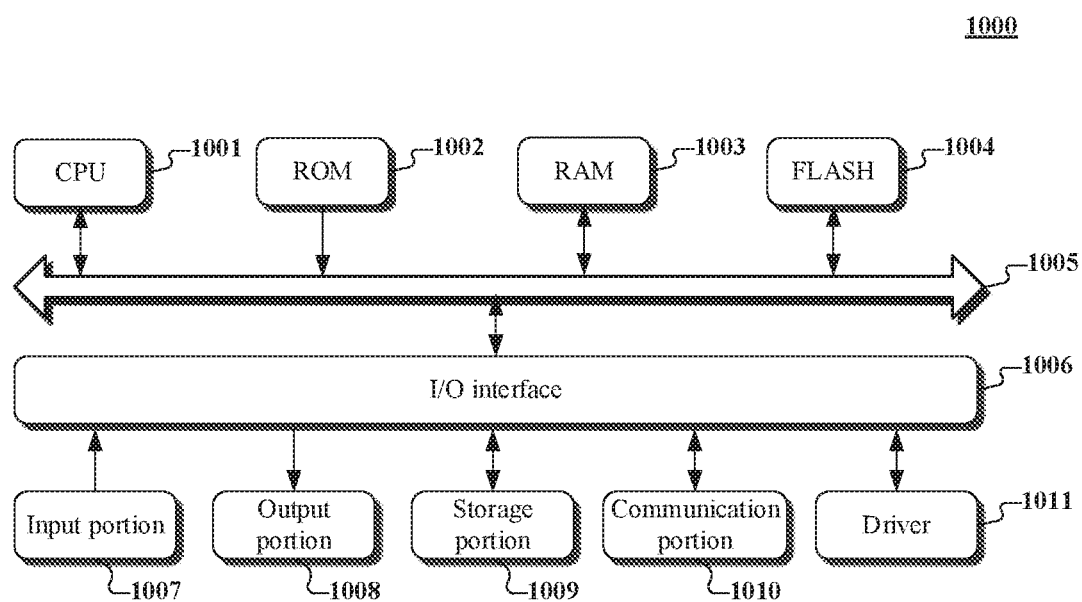
FIG. 10 is a schematic structural diagram of a system of an edge router suitable for implementing embodiments of the present disclosure.

With further reference to FIG. 10, a schematic structural diagram of a system 1000 of an edge router suitable for implementing embodiments of the present disclosure is shown. The edge router shown in FIG. 10 is merely an example, and should not impose any limitation on the function and scope of use of the embodiments of the present disclosure.

As shown in FIG. 10, the system 1000 of the edge router includes a central processing unit (CPU) 1001, which may execute various appropriate actions and processes in accordance with a program stored in a read-only memory (ROM) 1002, a random access memory (RAM) 1003 and a flash memory (FLASH) 1004. The RAM 1003 also stores various programs and data required by operations of the system 1000. The CPU 1001, the ROM 1002, the RAM 1003 and the FLASH 1004 may be connected to each other through a bus 1005. An input/output (I/O) interface 1006 is also connected to the bus 1005.

The following components may be connected to the I/O interface 1006: an input portion 1007 including such as a modem, an optical modem; an output portion 1008 including such as a computer, a switch; a storage portion 1009 including such as a hard disk; and a communication portion 1010 including a network interface card, such as a LAN card and a modem. The communication portion 1010 performs communication processes via a network, such as the Internet. A driver 1011 is also connected to the I/O interface 1006 as required.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 1010. The computer program, when executed by the central processing unit (CPU) 1001, implements the above mentioned functionalities as defined by the method of the present disclosure.

It should be noted that in the present disclosure, in order to facilitate the description of a plurality of tenant network edge devices and information related to each tenant network edge device during data transmission, they are named as the first tenant network edge device and the second tenant network edge device. There are also names such as the first response identifier, the second response identifier, the first request identifier, the second request identifier, the second tenant identifier, the first request message, the second request message, the first response message, and the second response message. Those skilled in the art should understand that the first and second therein do not constitute a special limitation.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RE medium etc., or any suitable combination of the above.

The flow charts and block diagrams in the accompanying drawings illustrate architectures, functionalities and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functionalities. It should also be noted that, in some alternative implementations, the functionalities denoted by the blocks may occur in a sequence different from the sequences shown in the accompanying drawings. For example, any two blocks presented in succession may be executed, substantially in parallel, or they may sometimes be in a reverse sequence, depending on the functionality involved. It should also be noted that each block in the block diagrams and/or flow charts as well as a combination of blocks may be implemented using a dedicated hardware-based system performing specified functionalities or operations, or by a combination of a dedicated hardware and computer instructions.

The units involved in the embodiments of the present disclosure may be implemented by means of software or hardware. The described units may also be provided in a processor, for example, may be described as: a processor including a first request message receiving unit, a first request identifier acquisition unit, a first request message processing unit and a first request message forwarding unit. Here, the names of these units do not in some cases constitute limitations to such units themselves. For example, the first request message receiving unit may also be described as "a unit configured to receive a first request message sent by a first tenant network edge device in at least one tenant network edge device".

In another aspect, the present disclosure further provides a computer readable medium. The computer readable medium may be included in the apparatus in the above described embodiments, or a stand-alone computer readable medium not assembled into the apparatus. The computer readable medium carries one or more programs. The one or more programs, when executed by the apparatus, cause the apparatus to: the edge router being in communication connection with a cloud gateway and at least one tenant network edge device; receive a first request message sent by a first tenant network edge device in the at least one tenant network edge device; acquire a first request identifier corresponding to the first tenant network edge device based on port information of a port connected to the first tenant network edge device, the first request identifier being used to identify the first tenant network edge device; add the first request identifier to the first request message to generate a processed first request message; and forward the processed first request message to the cloud gateway, based on a stored routing table.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functionalities disclosed in the present disclosure are examples.

What is claimed is:

1. A network access method for an edge router, the edge router being in communication connection with a cloud gateway and at least one tenant network edge device, the method comprising:
   receiving a first request message sent by a first tenant network edge device of the at least one tenant network edge device;
   acquiring a first request identifier corresponding to the first tenant network edge device based on port information of a port connected to the first tenant network edge device, the first request identifier being used to identify the first tenant network edge device;
   adding the first request identifier to the first request message to generate a processed first request message; and
   forwarding the processed first request message to the cloud gateway, based on a stored routing table,
   wherein acquiring a first request identifier corresponding to the first tenant network edge device based on port information of a port connected to the first tenant network edge device comprises:
   identifying the first tenant network edge device based on the port information of the port connected to the first tenant network edge device; and
   sending a request to the cloud gateway to acquire the first request identifier corresponding to the first tenant network edge device.

2. The method according to claim 1, wherein the method further comprises:
   receiving a first response message sent by the cloud gateway in response to the first request message, wherein the first response message comprises a first response identifier, and the first response identifier is used to identify the first tenant network edge device;
   removing the first response identifier for the first response message to generate a processed first response message; and
   forwarding the processed first response message to the first tenant network edge device, based on the port information.

3. The method according to claim 1, wherein the edge router is in communication connection with an access switch, and the access switch is in communication connection with a second tenant network edge device of the at least one tenant network edge device, and the method further comprises:
   receiving an intermediate message sent by the access switch, wherein the intermediate message comprises a second tenant identifier and a second request message received by the access switch from the second tenant network edge device, and the second tenant identifier is used to identify the second tenant network edge device;
   acquiring a second request identifier corresponding to the second tenant network edge device based on the second tenant identifier;
   adding the second request identifier to the intermediate message, and removing the second tenant identifier, to generate a processed intermediate message; and
   forwarding the processed intermediate message to the cloud gateway, based on the routing table.

4. The method according to claim 3, wherein the method further comprises:

receiving a second response message sent by the cloud gateway in response to the second request message, wherein the second response message comprises a second response identifier, and the second response identifier is used to identify the second tenant network edge device;

acquiring the second tenant identifier corresponding to the second tenant network edge device based on the second response identifier;

removing the second response identifier for the second response message, and adding the second tenant identifier, to generate a processed second response message; and forwarding the processed second response message to the access switch, based on the routing table.

5. A network access apparatus in an edge router, the edge router being in communication connection with a cloud gateway and at least one tenant network edge device, the apparatus comprising:

at least one processor; and a memory storing instructions, wherein the instructions when executed by the at least one processor, cause the at least one processor to perform operations, the operations comprising:

receiving a first request message sent by a first tenant network edge device of the at least one tenant network edge device;

acquiring a first request identifier corresponding to the first tenant network edge device based on port information of a port connected to the first tenant network edge device, the first request identifier being used to identify the first tenant network edge device;

adding the first request identifier to the first request message to generate a processed first request message; and forwarding the processed first request message to the cloud gateway, based on a stored routing table, wherein acquiring a first request identifier corresponding to the first tenant network edge device based on port information of a port connected to the first tenant network edge device comprises:

identifying the first tenant network edge device based on the port information of the port connected to the first tenant network edge device; and sending a request to the cloud gateway to acquire the first request identifier corresponding to the first tenant network edge device.

6. The apparatus according to claim 5, wherein the operations further comprise:

receiving a first response message sent by the cloud gateway in response to the first request message, wherein the first response message comprises a first response identifier, and the first response identifier is used to identify the first tenant network edge device;

removing the first response identifier for the first response message to generate a processed first response message; and forwarding the processed first response message to the first tenant network edge device, based on the port information.

7. The apparatus according to claim 5, wherein the edge router is in communication connection with an access switch, and the access switch is in communication connection with a second tenant network edge device of the at least one tenant network edge device, and the operations further comprise:

receiving an intermediate message sent by the access switch, wherein the intermediate message comprises a second tenant identifier and a second request message received by the access switch from the second tenant network edge device, and the second tenant identifier is used to identify the second tenant network edge device;

acquiring a second request identifier corresponding to the second tenant network edge device based on the second tenant identifier;

adding the second request identifier to the intermediate message, and removing the second tenant identifier, to generate a processed intermediate message; and forwarding the processed intermediate message to the cloud gateway, based on the routing table.

8. The apparatus according to claim 7, wherein the operations further comprise:

receiving a second response message sent by the cloud gateway in response to the second request message, wherein the second response message comprises a second response identifier, and the second response identifier is used to identify the second tenant network edge device;

acquiring the second tenant identifier corresponding to the second tenant network edge device based on the second response identifier;

removing the second response identifier for the second response message, and adding the second tenant identifier, to generate a processed second response message; and forwarding the processed second response message to the access switch, based on the routing table.

9. A non-transitory computer readable medium, storing a computer program thereon, the program, when executed by a processor, causes the processor to implement a method for an edge router, the edge router being in communication connection with a cloud gateway and at least one tenant network edge device, the method comprising:

receiving a first request message sent by a first tenant network edge device of the at least one tenant network edge device;

acquiring a first request identifier corresponding to the first tenant network edge device based on port information of a port connected to the first tenant network edge device, the first request identifier being used to identify the first tenant network edge device;

adding the first request identifier to the first request message to generate a processed first request message; and forwarding the processed first request message to the cloud gateway, based on a stored routing table, wherein acquiring a first request identifier corresponding to the first tenant network edge device based on port information of a port connected to the first tenant network edge device comprises:

identifying the first tenant network edge device based on the port information of the port connected to the first tenant network edge device; and sending a request to the cloud gateway to acquire the first request identifier corresponding to the first tenant network edge device.

10. The non-transitory computer readable medium according to claim 9, wherein the method further comprises:

receiving a first response message sent by the cloud gateway in response to the first request message, wherein the first response message comprises a first response identifier, and the first response identifier is used to identify the first tenant network edge device;

removing the first response identifier for the first response message to generate a processed first response message; and forwarding the processed first response message to the first tenant network edge device, based on the port information.

11. The non-transitory computer readable medium according to claim 9, wherein the edge router is in communication connection with an access switch, and the access switch is in communication connection with a second tenant network edge device of the at least one tenant network edge device, and the method further comprises:

receiving an intermediate message sent by the access switch, wherein the intermediate message comprises a second tenant identifier and a second request message received by the access switch from the second tenant network edge device, and the second tenant identifier is used to identify the second tenant network edge device;

acquiring a second request identifier corresponding to the second tenant network edge device based on the second tenant identifier;

adding the second request identifier to the intermediate message, and removing the second tenant identifier, to generate a processed intermediate message; and forwarding the processed intermediate message to the cloud gateway, based on the routing table.

12. The non-transitory computer readable medium according to claim 11, wherein the method further comprises:

receiving a second response message sent by the cloud gateway in response to the second request message, wherein the second response message comprises a second response identifier, and the second response identifier is used to identify the second tenant network edge device;

acquiring the second tenant identifier corresponding to the second tenant network edge device based on the second response identifier;

removing the second response identifier for the second response message, and adding the second tenant identifier, to generate a processed second response message; and forwarding the processed second response message to the access switch, based on the routing table.

* * * * *